United States Patent

[11] 3,600,558

[72] Inventor Gregory Grosbard
Long Beach, N.Y.

[21] Appl. No. 822,850
[22] Filed Apr. 17, 1969
[45] Patented Aug. 17, 1971
[73] Assignee International Research Development, Inc.

[54] CODED CARD AND READING MEANS
15 Claims, 4 Drawing Figs.

[52] U.S. Cl. .................. 235/61.11 E, 250/219 DC
[51] Int. Cl. .................. G06k 7/10, G01n 21/30
[50] Field of Search .................. 235/61.11, 61.11 E; 250/219 Q, 219

[56] References Cited

UNITED STATES PATENTS

| | | | |
|---|---|---|---|
| 3,028,081 | 4/1962 | Knight | 235/61.11 E |
| 3,189,745 | 6/1965 | Van Reymersdal | 235/61.11 X |
| 3,436,553 | 4/1969 | Bevis | 235/61.11 E |
| 3,446,973 | 5/1969 | Springer, Jr. | 235/61.11 E |
| 3,460,100 | 8/1969 | Rutledge et al. | 235/61.11 E |

*Primary Examiner*—Daryl W. Cook
*Attorneys*—Clarence A. O'Brien and Harvey B. Jacobson

ABSTRACT: The code punch holes in a data processing card are detected by sensing devices in a code reading apparatus to obtain information form both the location of the holes and the number of holes in each column. Electronic oscillators generate the signals fed to logic and decoding circuits when the holes are detected by the sensing devices.

Gregory Grosbard
INVENTOR

BY Clarence A. O'Brien
and Harvey B. Jacobson
Attorneys

Gregory Grosbard

INVENTOR.

BY Clarence A. O'Brien and Harvey B. Jacobson

Attorneys

CODED CARD AND READING MEANS

This invention relates to the reading of coded information on data processing cards.

The amount of information capable of being encoded on a punch hole type of data processing card, is limited by the number of punch hole locations on the data card. As data processing systems become more complicated, an increase in the data handling capacity of such data processing record cards would be desirable. It is therefore an important object of the present invention to enlarge the data handling capability of punch hole types of data processing cards without increasing their size to avoid costly replacement of card handling equipment as well as to maintain hardware space requirements as low as possible.

In accordance with the present invention, data reading apparatus is provided for the aforementioned data processing record cards utilizing code hole detectors of the nonmechanical type wherein no physical contact is made with the data card for sensing the presence of a punch hole. Further, in addition to detecting the presence of a punch hole so as to produce a digital signal, the number of punch holes in each column are counted in order to furnish additional information and thereby enlarge the amount of information capable of being handled by the data card. The digital signals are generated by rendering oscillators operative in response to detection of the punch holes. In one embodiment of the invention, the hole sensing devices are of the optical type. Passive tuning elements are utilized in another type of nonmechanical hole sensing device.

In another form of the invention, each of the oscillators generating digital signals in response to detection of punch holes in the record card, are rendered operative at different oscillating frequencies to thereby introduce an additional code factor increasing the amount of coded information capable of being handled by the data processing card.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
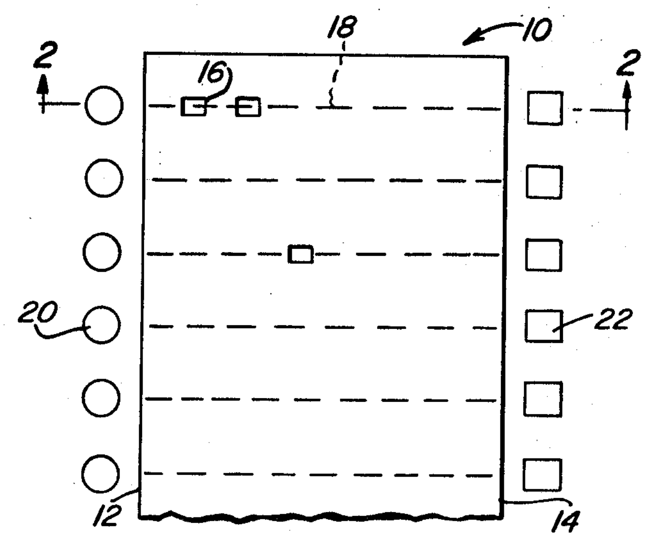
FIG. 1 is a schematic top plan view of a data processing card disposed in a code reading position within a reading apparatus made in accordance with the present invention.

FIG. 1 illustrates a data record card generally denoted by reference numeral 10 that is relatively flat and is adapted to be positioned within a reading apparatus so that coded information may be retrieved therefrom. The record card 10 as shown is generally rectangular in shape and includes opposite, parallel edges 12 and 14 between which coded punch holes 16 are formed. As is well known, the information carried by such record cards is determined from the location of the code holes 16 aligned in columns 18 and in rows perpendicular to the columns parallel to the edges 12 and 14. Thus, in the reading position of the card as illustrated in FIG. 1, each column 18 is aligned with one of a plurality of sources of radiation 20 disposed adjacent to and along the edge 12. Also aligned with each of the columns 18, is one of a plurality of edge sensing devices 22 disposed along edge 14.

Figure 2:
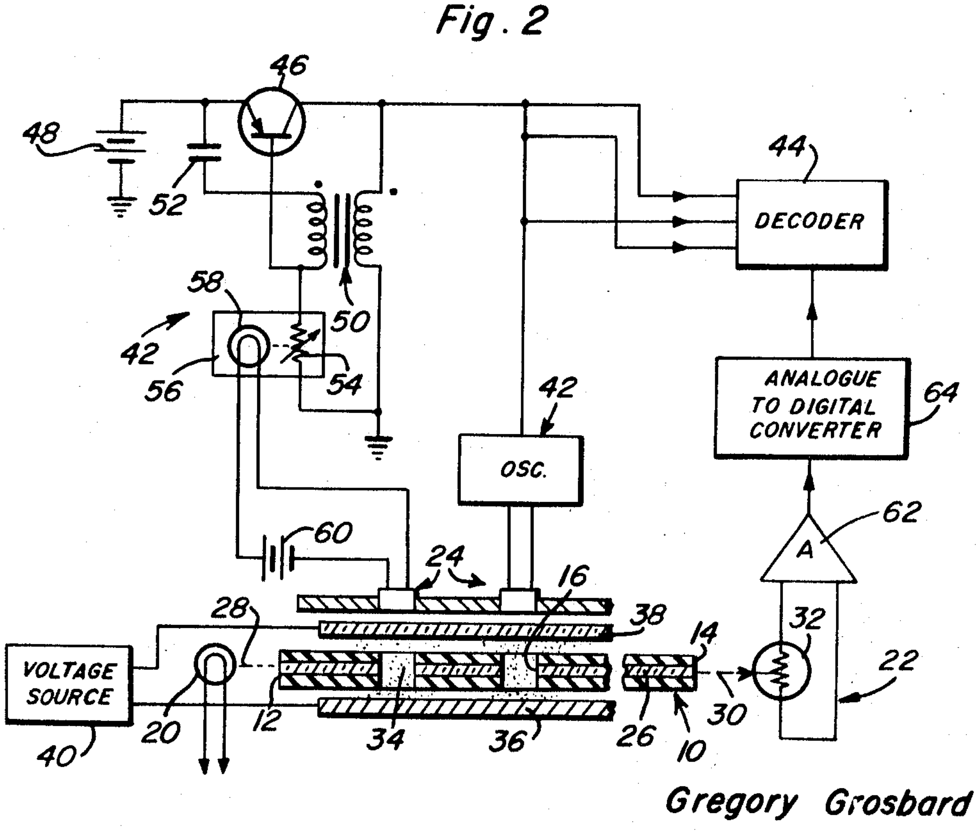
FIG. 2 is a diagrammatic view of the data record card and reading apparatus as viewed from a plane indicated by section line 2–2 in FIG. 1.

As shown in FIG. 2, the data processing record card 10 is opaque and in its reading position has each of its code hole locations aligned with a code hole detecting device 24 disposed in a plane generally parallel to the plane of the record card, and closely spaced from its surface. In the illustrated embodiment, the record card has embedded therein along each column 18, an optical fiber 16. Thus, when a coded punch hole is formed in the card, it will intersect the optical fiber aligned with the column in which the punch hole is located. The hole detecting devices 24 will therefore sense the presence or absence of punch holes by detecting the presence of radiation emitted from each punch hole. The radiation emitted from each punch hole is derived from the radiation sources 20 aforementioned in connection with FIG. 1.

With continued reference to FIG. 2, it will be noted that each radiation source 20 is aligned with the optical fiber 26 in a column 18 so that a collimated light beam 28, emitted for example from the radiation source 20, may be transmitted along the optical fiber with which it is aligned. A beam of light 30 will accordingly emerge from the edge 14 of the card 10 in alignment with an edge sensing device 22 which includes a photoresistive element 32 in one embodiment of the invention. The photoresistive element 32 measures the level of radiation emerging from the optical fiber 26 to thereby determine the number of code holes 16 in the column. The level of radiation in the emerging light beam 30 will indicate the number of code holes in the column because a predetermined amount of radiation is absorbed within each code hole intersecting the optical fiber. Thus, if there are no code holes in a particular column, substantially all of the radiation will be transmitted by the optical fiber producing a maximum radiation measurement by the photoresistive element 32. A minimum radiation level measurement is obtained when the optical fiber is intersected by the maximum number of code holes in the associated column.

In order to control absorption of radiation in each code hole 16, a powder cloud 34 may be established therewithin between electrode plates 36 and 38 across which a potential is maintained by a suitable voltage source 40. The amount of radiation absorbed as it passes through the code hole 16 will be a function of the strength of the electric field between the electrode plates as disclosed for example in U.S. Pat. No. 2,792,752, issued May 21, 1957. Furthermore, the electrode plate 36 is made of reflective material to reflect radiation through the other electrode plate 38 which is made of transparent material so that the radiation passing through the punch holes 16 may be readily detected by the photodetecting devices 24.

Each hole detecting device 24 is connected to a pulse generator 42. Thus, whenever the presence of a code hole 16 is detected by a detecting device 24, it is operative through the generator 42 to feed a digital signal to a decoding signal network 44. FIG. 2 illustrates one form of signal generator or oscillator 42 that may be suitable for the purpose. This type of signal generator includes a blocking oscillator transistor 46 having an input emitter connected to a power source 48 and an output collector from which an output signal is fed to the decoder 44. The output collector circuit is inductively coupled by a transformer 50 to the base emitter circuit of the transistor 46 which includes capacitor 52 connected in series with the primary winding of the transformer between the emitter and a variable impedance element 54 of a photoresistive link component 56 having a light emitting device 58 connected in series with the sensor 24 to a direct current power source 60. Thus, a small change in resistance of the sensor 24 which occurs when light is emitted from a code hole 16, produces a relatively large change in output frequency of the signal generator 42 to a value which may be detected by a frequency tuned circuit in the decoder 44 producing a digital signal.

While the outputs of the signal generators 42 produce digital information in accordance with the location of the code holes 16 in the data record card 10, the measurements made by the photoresistive elements 32 in the edge sensing devices 22, produce a count of the number of code holes in each column 18. Thus, the output of each photoresistive element 32 as shown in FIG. 2, is amplified by an amplifier 62 supplying an analogue signal to an analogue-to-digital converter 64 from which counting pulses are fed to the decoder 44. Any suitable analogue-to-digital converter may be utilized for this purpose such as the analogue-to-binary conversion apparatus disclosed in U.S. Pat. No. 3,193,668 to Clapper, issued July 6, 1965.

Figure 3:
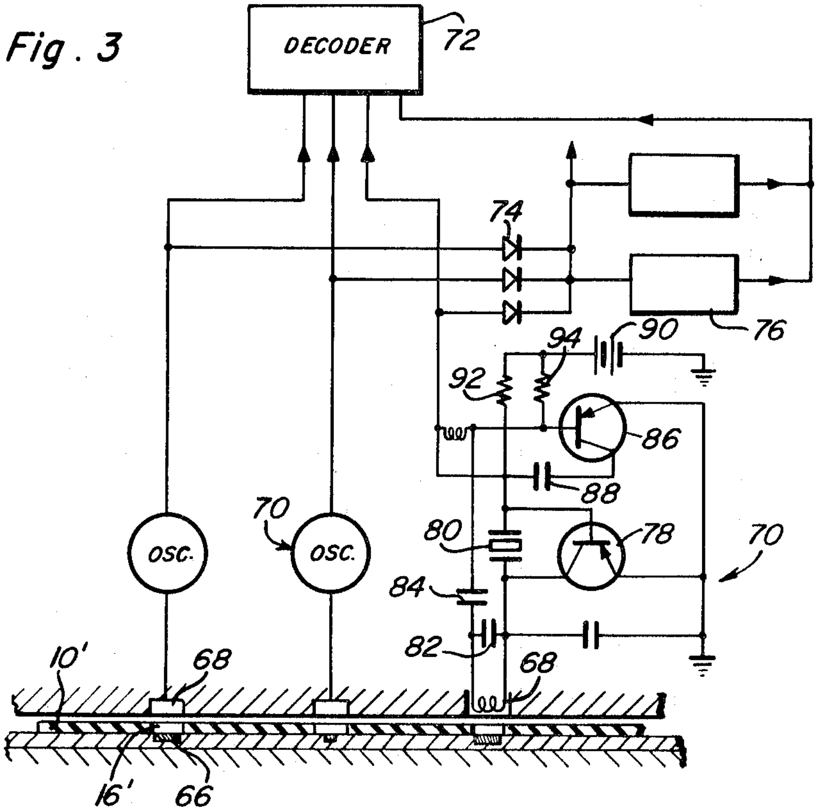
FIG. 3 is a diagrammatic sectional view through another type of data record card and reading apparatus in accordance with the present invention.

FIG. 3 illustrates another form of the invention in which a conventional type of data processing card 10' having code holes 16' formed therein may be operatively positioned within a reading apparatus so that each code hole location is aligned with one of a plurality of passive elements such as fixedly mounted inductive tuning slugs 66. Also aligned with each code hole location, is a hole detecting element 68 connected to an associated oscillator 70 from which an output signal is obtained in response to the presence of a punch hole at a location on the card corresponding to an associated oscillator. The output of each oscillator is connected to a decoder network 72. Also, the output of each oscillator is connected through a diode 74 to a plurality of threshold circuits 76. It will be apparent therefore, that for each column of code holes, there will be a predetermined number of oscillators 70 to which the threshold circuits 76 are connected. Each threshold circuit will have a different threshold value corresponding to a different number of code holes so that each threshold circuit will produce a different signal supplied to the decoder 72 representing the number of punch holes detected or oscillators 70 rendered operative.

While the outputs of the oscillators 70 may be decoded as digital pulses corresponding to the different locations of the code holes and the number of oscillators rendered operative in each column counted, the output of each oscillator may also be recognized by a different operating frequency so as to increase the coding possibilities and thereby enlarge the data handling capability of the record card and the reading apparatus. Each oscillator 70 may include a PNP transistor 78 and a crystal element 80 in its base collector circuit so as to control oscillation at a fixed operating frequency selected for each particular oscillator. The hole detecting element 68 is connected to the collector of the transistor 78 to form with the parallel connected capacitor 82, a tank circuit which is ordinarily detuned from the operating frequency of the oscillator to prevent operation thereof. However, when the inductive coil 68 constituting the hole detecting element, is aligned with a proper tuning slug 66 and is not separated therefrom by the material of the record card 10' because of the presence of a code hole, the oscillator 70 becomes operative at its fixed frequency. The material of which the record cards are made is therefore selected so as to significantly affect the inductance of the coil 68 in the presence of a tuning slug 66. The output of the oscillator is fed through coupling capacitor 84 to the base of transistor 86 of a frequency tuned amplifier from which an output signal is fed through signal coupling capacitor 88 to the decoder 72 and the threshold circuits 76 as aforementioned. Base bias for the transistors 78 and 86 are supplied from power source 90 through bias resistors 92 and 94.

Figure 4:
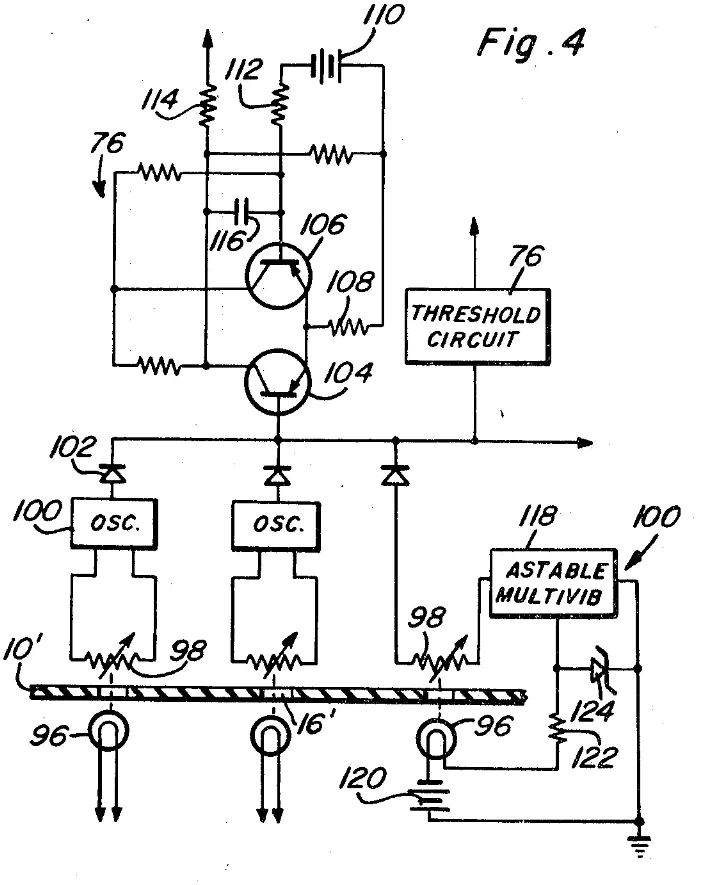
FIG. 4 is a diagrammatic sectional view illustrating yet another form of reading apparatus in accordance with the present invention.

In FIG. 4, a simpler reading apparatus arrangement is illustrated in which the punch holes 16' in the same type of data processing record card 10' as described in connection with FIG. 3, may be optically detected by the alignment of radiation sources 96 with the code hole locations for the record card in its reading position. Also aligned with the code hole locations are photoresistive elements 98 connected to oscillators 100 rendered operative when light conducted through a code hole 16' impinges on a photoresistive element 98. The outputs of the oscillators are fed through diodes 102 to a decoder as hereinbefore indicated in connection with FIG. 3 and to a plurality of threshold circuits 76 as described in connection with FIG. 3 for counting of the number of code holes in a column. Each threshold circuit 76 may for example include transistors 104 and 106 the emitters of which are connected through a resistor 108 to the positive terminal of a power source 110. A negative voltage bias is applied from the power source through resistor 112 to the base of transistor 106 in order to determine the threshold value of the circuit. When a predetermined number of oscillators 100 are rendered operative, the combined output signal applied therefrom to the base of transistor 104 overcomes the threshold bias of the circuit to render transistor 104 conductive to supply an output signal to the decoder through resistor 114. When transistor 104 is nonconductive, the capacitor 116 is charged to hold the threshold circuit in a quiescent condition.

FIG. 4 also illustrates one form of oscillator 100 that may be suitable as a signal generator responsive to detection of a code hole by the photoresistive element 98. The oscillator 100 includes an astable multivibrator 118 the output of which is connected in series with the photoresistive element 98 and to which power is supplied from a power source 120 in series with the radiation source 96 and the resistor 122. A grounded zener diode 124 is connected in shunt relation to the multivibrator for limiting the amplitude of its output pulse.

It will be apparent from the foregoing description, that a data processing record card may be read by positioning thereof in operative relation to noncontact types of punch hole sensing devices in order to obtain information from the location of the punch holes on the card. Additional information is also obtained by counting the number of punch holes in each column. In certain forms of the invention, the number of holes in each column are counted by measuring the level of the combined output signal of the oscillators associated with the respective code hole sensing devices, utilizing threshold circuits for this purpose. In another form of the invention, the amount of radiation absorbed or transmitted through an optical fiber is measured in order to determine the number of code holes in the column. Also, by utilizing oscillators having different operating frequencies, an additional code factor is introduced in one of the forms of the invention in order to enlarge the data handling capability of the data processing record card.

What is claimed as new is as follows:

1. In combination with an opaque record member having optical fibers extending therethrough and code punch holes intersecting the fibers, code reading apparatus including a source of radiation operatively positioned relative to the record member, sensing means for detecting transmission of radiation from said source through the fibers, signal means connected to the sensing means for determining the number of holes intersecting each of the fibers and decoding means connected to said signal means.

2. The combination of claim 1 wherein said signal means includes a plurality of oscillators rendered operative by said sensing means to generate output signals when the record card is operatively positioned relative to said source radiation.

3. The combination of claim 2 wherein said sensing means includes a plurality of photoresistive elements optically aligned with the radiation source and the punch holes when the record card is operatively positioned, means for absorbing radiation conducted by the fibers while passing through the punch holes, and signal conversion means connected to the photoresistive elements for producing a digital output corresponding to the level of radiation transmitted to the photoresistive elements representing the number of holes intersecting said fibers.

4. The combination of claim 1 wherein said sensing means includes a plurality of photoresistive elements optically aligned with the radiation source and the punch holes when the record card is operatively positioned, means for absorbing radiation conducted by the fibers while passing through the punch holes, and signal conversion means connected to the photoresistive elements for producing a digital output corresponding to the level of radiation transmitted to the photoresistive elements representing the number of holes intersecting said fibers.

5. In combination with a data record member having code punch holes aligned in columns, code reading apparatus including a plurality of oscillators, sensing means operatively positioned relative to the record member for rendering the oscillators operative in response to detection of said punch holes, decoding means connected to said oscillators, and logic circuit means connected to said oscillators for counting the number of holes in the columns.

6. The combination of claim 5 wherein said sensing means comprises a plurality of photosensing elements.

7. The combination of claim 5 wherein said sensing means comprises a plurality of fixedly mounted tuning elements adapted to be aligned with the holes in the record member, said oscillators having tuning circuits aligned with the tuning elements and spaced therefrom by the record member.

8. The combination of claim 7 wherein said logic circuit means includes threshold circuits connected to the oscillators associated with the respective column of holes.

9. The combination of claim 5 wherein said logic circuit means includes threshold circuits connected to the oscillators associated with the respective column of holes.

10. In combination with a record member having code punch holes formed therein and aligned in a column perpendicular to the direction of movement of the record member to a reading position, code reading apparatus includinga plurality of hole sensing devices mounted for alignment with the punch holes in the reading position of the record member, a plurality of oscillators respectively connected to said sensing devices and rendered operative in response to detection of the holes by the sensing devices, and means responsive to detection of the punch holes in said column for counting the number of holes in the column.

11. The combination of claim 10 wherein said oscillators are rendered operative at different oscillating frequencies.

12. The combination of claim 10 wherein said sensing devices comprise photodetecting elements sensing radiation emitted from the holes in the record member, said hole counting means including means for measuring the level of radiation transmitted through the record member in intersecting relation to the holes in the column.

13. In combination with a record member having code punch holes formed therein and aligned in a column, code reading apparatus including a plurality of sensing devices for detecting individual holes in the column and means for counting the number of holes in the column.

14. The combination of claim 13 wherein said hole counting means includes a source of radiation transmitted through the record member substantially parallel to the column intersecting the holes, and means for measuring the level of radiation transmitted.

15. The combination of claim 13 wherein said hole counting means includes threshold circuits connected to said sensing devices.